Patented Aug. 28, 1923.

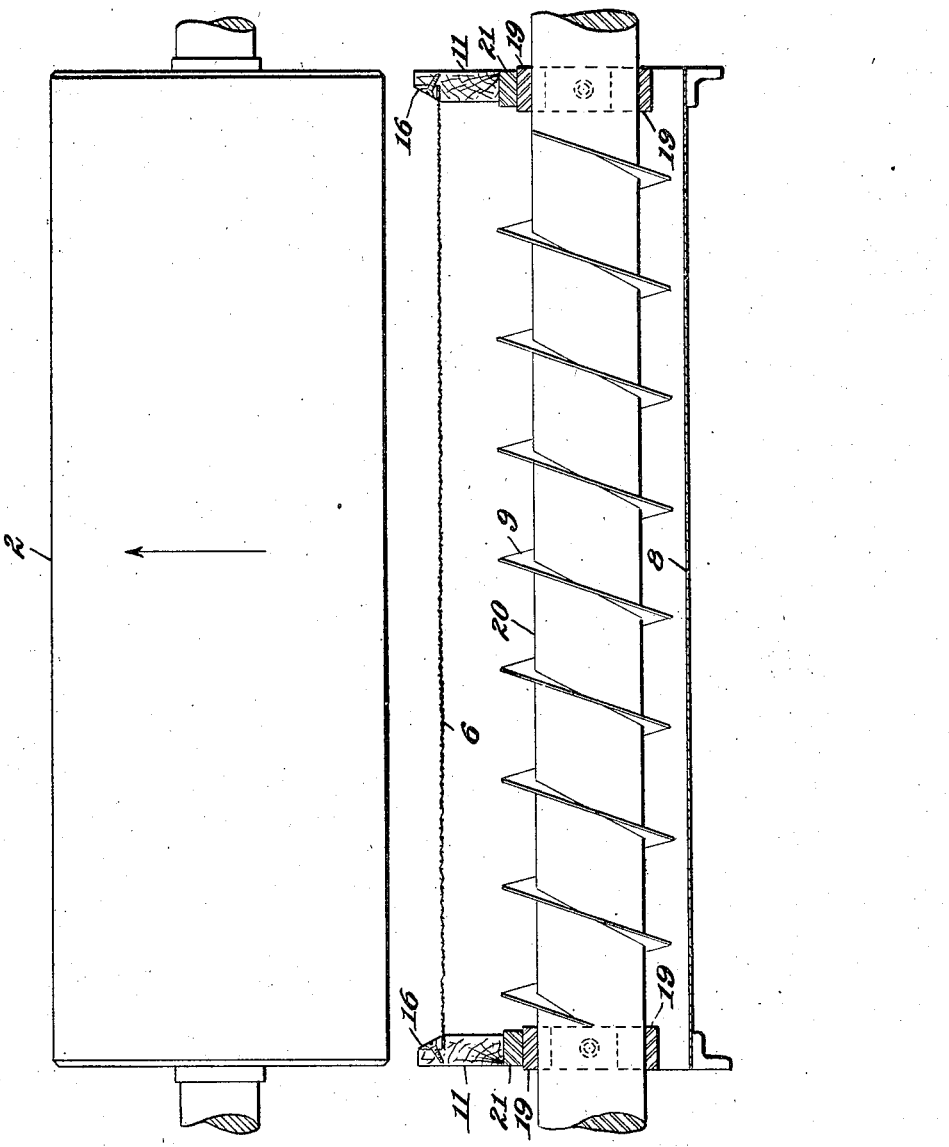

1,466,508

UNITED STATES PATENT OFFICE.

EDMUND F. LAKE, OF OWENSBORO, KENTUCKY, ASSIGNOR TO ANGLO AMERICAN MILL CO., OF OWENSBORO, KENTUCKY, A CORPORATION OF KENTUCKY.

SCALPER SIEVE FOR MILLS.

Application filed March 18, 1920. Serial No. 366,774.

*To all whom it may concern:*

Be it known that I, EDMUND F. LAKE, a citizen of the United States, residing at Owensboro, in the county of Daviess and State of Kentucky, have invented new and useful Improvements in Scalper Sieves for Mills, of which the following is a specification.

The present invention relates to improvements in rolling mills particularly of the type adapted for making flour and meal and the especial object of the invention is to provide an improved scalper sieve.

It is well understood that the quality or grade of flour and meal produced by a rolling mill is improved if the initial separation thereof from the ground stock is very thorough. Among the objects of the present invention is to provide a scalper sieve adapted to cooperate with the primary break rolls of a mill and to effect a maximum separation of the flour or meal from the bran or coarser particles while the particles are traveling a minimum distance and while the action of the sieve on the particles of bran and so forth will not tend to break them up.

More particularly the present invention relates to the means for supporting and transmitting vibrations to the sieve and will be described in connection with the accompanying drawings, in which:

Figure 4 is a view substantially on the line A—A of Figure 1.

Figure 1:
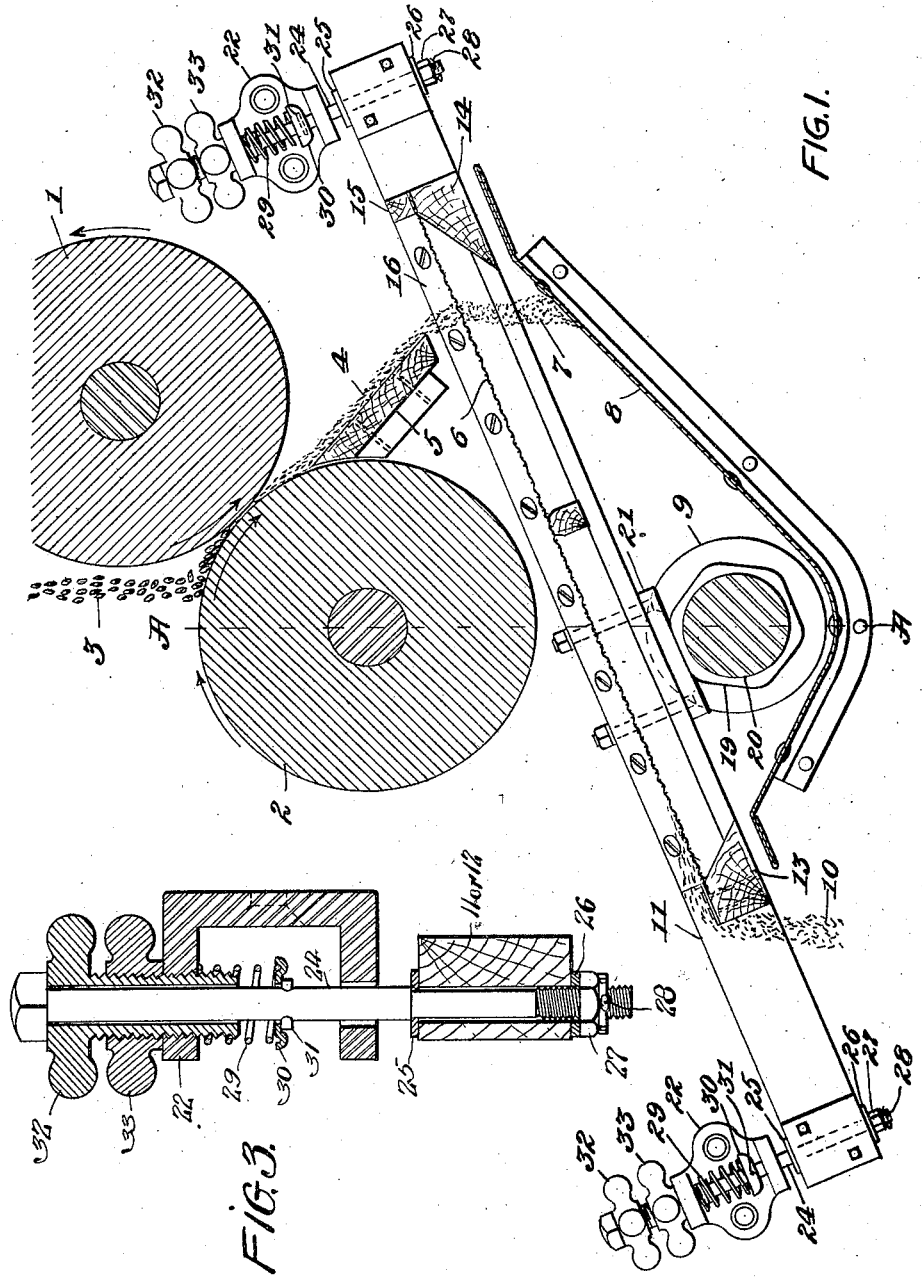
Figure 1 is a longitudinal vertical section through a portion of a grinding mill having therein a scalper sieve embodying the present invention.
Figure 2:
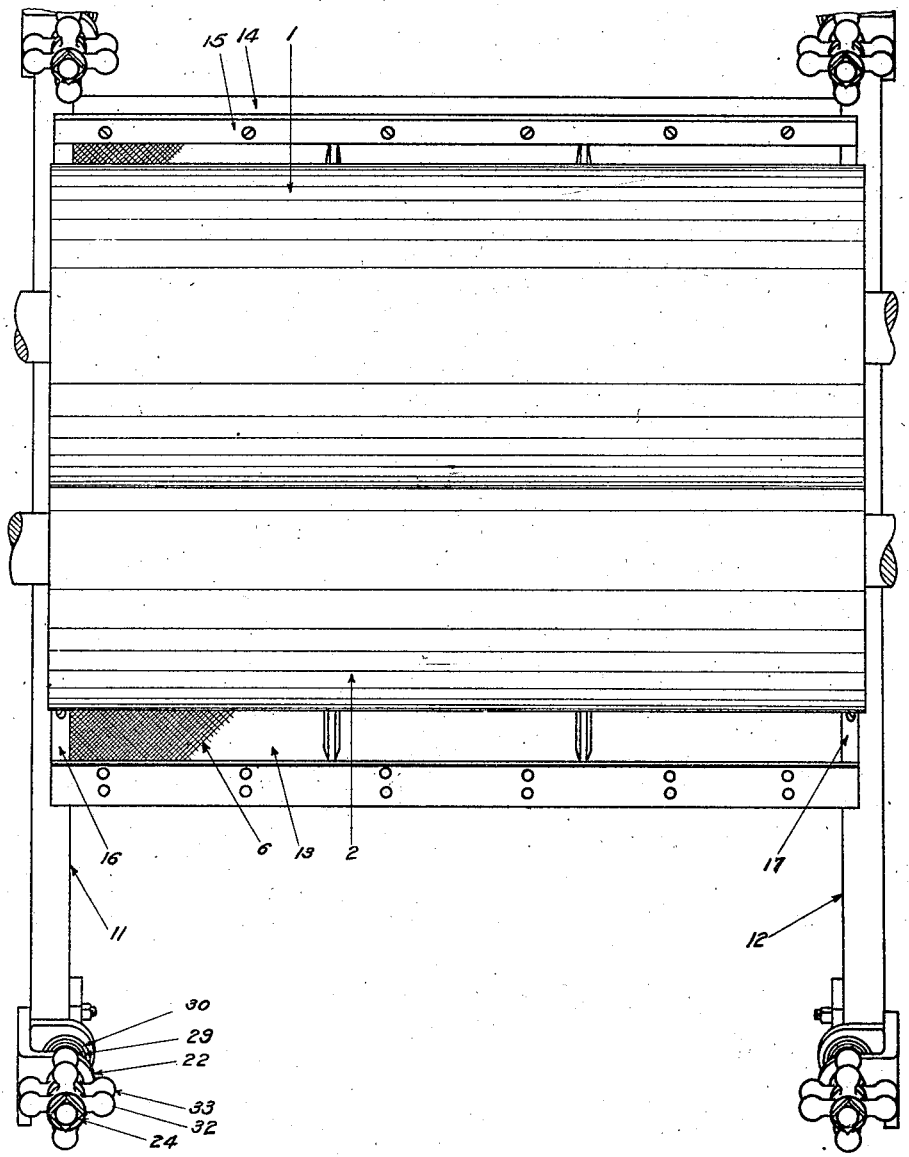
Figure 2 is a plan of the parts shown in Figure 1, a portion of the frame being broken away.

Referring to the drawings, 1, 2, respectively, designate the upper and lower members of a pair of break rolls which are adapted to be rotated in the directions indicated by arrows so as to crush grain fed between them. In the drawings the stream of grain supplied to the break rolls is indicated at 3, and 4 indicates the crushed product, being a mixture of flour and bran which is delivered over an inclined feed board 5, onto the screen or sieve 6 of the scalper.

Beneath the scalper is arranged a trough-like receptacle 8 into which the flour and middlings 7, separated from the stream of crushed material flowing over the screen 6 is collected and from which it is removed by a spiral or helicoid conveyer 9.

The coarser particles which will not pass through the screen or sieve 6 are delivered over the lower end of the scalper in a stream 10, in the usual manner.

It is customary to impart a vibratory movement to the scalper sieve so that all of the flour and small middlings will, if possible, be separated from the coarser particles and collected in the trough 8. Heretofore, however, it has been customary to impart positive vibratory movement to the scalper sieve in one direction only, namely, in a direction which would move the sieve toward the break rolls. By the present invention the sieve is so supported that it is free to vibrate bodily throughout its entire area and means are provided whereby it is thus moved positively in opposite directions. Means are also provided by which the extent of vibratory movement of the sieve may be regulated and varied as desired, the supporting means permitting of an independent adjustment of different portions of the sieve frame.

As shown, the scalper comprises a rectangular shaped frame including longitudinal side members 11, 12, and cross bars or end pieces 13, 14, suitably secured to the side bars, the sieve screen 6 being fastened to the said frame by suitable means. As shown, strips 15, 16 and 17 are placed over the sieve or screen and secured severally by screws to the frame members 11, 14 and 12, while the lower end of the screen or sieve is clamped against the upper surface of cross bar 13 by a relatively thin plate-like strip secured to the cross bar by any suitable fastening means.

Figure 3:
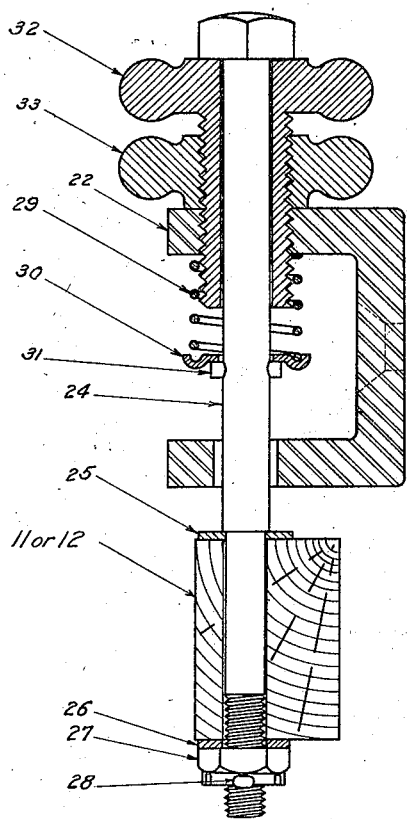
Figure 3 is an enlarged, detail, sectional view, through one of the suspension supports for the sieve.

To each end of each of the side members 11, 12, of the scalper frame is secured a suspension rod 24. As shown particularly in Figures 1 and 3 the portion of the rod that extends through the frame member is slightly reduced in diameter and washers 25, 26, respectively, bear against the top and bottom surfaces of the frame member. The lower end of each rod is threaded and a nut 27 thereon acts to force the washers 25, 26 into close contact with the frame bar and prevent independent relative movement between the suspension rod and scalper frame.

A cotter pin 28 confines the nut 27 in locking position.

Each of the suspension rods extends upwardly through alined passages formed in parallel lugs projecting from a stationary bracket 22. A coil spring 29 surrounds each suspension rod, one end thereof bearing against the upper lug of the bracket 22, while the lower end is received in a groove formed in a washer 30 fitted about the rod and held from downward movement thereon by a removable pin 31. At its upper end each rod is provided with an enlarged head which cooperates with an adjustable stop 32, the stem of which is threaded and engages a corresponding thread in the passage in the upper lug of the bracket 22. A lock nut 33 on the tubular stem of the adjustable stop 32 enables the latter to be rigidly secured in any adjusted position relative to the bracket 22. As shown, the suspension rod is in the form of a relatively long bolt, the threaded portion of which is engaged by the nut 27 while the polygonal head thereof cooperates with the adjustable stop 32.

It will be seen that the scalper frame is thus suspended from the stationary brackets 22 and that the several springs 29 act to positively move it downward to the position in which the heads of the suspension rods bear upon the adjustable stops 32. Means are provided by which the scalper is positively moved or vibrated bodily in opposition to the action of the springs 29. In the particular embodiment of the invention illustrated, a suitable cam 19 is secured to the shaft 20 of the conveyer 9 in position to cooperate with a side bar of the frame. Preferably a metal wear plate 21 is secured by suitable fastening devices to the lower face of the frame to contact directly with the cam and thus prevent undesirable wear of the frame. It will be evident that as the shaft 20 rotates a series of upward vibrations will be imparted to the scalper frame and the consequent compression of the springs 29. As soon as the highest portion of the cam passes from contact with the plate 21 the springs 29 will positively move the scalper frame downward. At each upward movement of the scalper the heads or enlargements at the outer ends of the suspension rods 24 will be carried away from the adjustable stops 32 and when the springs 29 return the parts to the positions shown in the drawings the enlargements or heads on the suspension rods will contact suddenly with said stops thus imparting a distinct vibration or jar to the scalper frame. The cam 19 acts to impart a series of jars or vibrations to the scalper frame and similarly the contacting of the suspension rods with the stops 32 will jar or vibrate the frame and thereby a maximum amount of vibration of the material is obtained with a screen of minimum length.

The force of the blows or jars imparted to the frame by the cam 19 can be readily varied by adjustment of the stops 32 by means of which the scalper may be bodily adjusted relative to the cam and as each of the suspension devices includes an independently adjustable stop, it will be seen that the several corners of the frame can be adjusted so that any desired relation between the screen and cam may be maintained. The lock nuts 33 prevent relative movement between the stationary brackets 22 and the adjustable stops and suspension rods resting thereon.

One of the important advantages of the invention is the fact that the scalper may be readily removed from the mill. If the cotter pins 28 are withdrawn, the nuts 27 can be easily removed and by then removing the pins 31 the suspension rods can be drawn outwardly from the frame of the scalper and the latter easily removed from the mill casing.

It will be understood that in the accompanying drawings many of the parts are shown more or less conventionally and while there is illustrated in some detail one embodiment of the invention, which is now believed to be the preferred form, it is not intended to limit the invention to the exact structure shown. There can manifestly be modification of many of the details shown in the drawings and described in the foregoing specification without departing from the invention.

Having thus described the invention what is claimed is:

1. In a scalper sieve for mills, the combination with a frame and sieve mounted therein, of means for supporting said frame in an inclined position comprising a stationary bracket above the frame, a rod attached to the frame and extending upward through a passage in the bracket, means on the rod above the bracket for limiting downward movement of the frame, a spring interposed between an abutment on the rod and the bracket, and a rotary cam mounted below and adapted to intermittingly move the frame upward in opposition to the action of the spring.

2. In a scalper sieve for mills, the combination with a frame and sieve mounted therein, of means for supporting the frame comprising a stationary supporting member, a rod attached at one end to the frame and extending freely through a passage in the supporting member, adjustable means cooperating with the supporting member to determine the maximum distance between the sieve frame and said member, a spring acting to maintain the sieve at said maximum distance from the supporting member, and a rotary cam arranged on the opposite side of the sieve frame from the spring and adapted to intermittingly move the frame in opposition to the spring.

3. In a scalper sieve, the combination with a frame and a sieve mounted therein, of a relatively stationary supporting member positioned above the frame, a rod attached to the sieve frame and extending upward through a passage in the supporting member, said rod having a portion above the supporting member that extends laterally across the passage through which the rod passes and an abutment for a spring between said supporting member and the sieve frame, a coiled spring surrounding the rod between said abutment thereon and the supporting member, and a rotary cam arranged beneath the sieve frame and adapted to intermittingly move the frame and rod in opposition to the spring.

4. In a scalper sieve, the combination with a frame and a sieve mounted therein, of a relatively stationary supporting member positioned above the frame, a rod attached to the sieve frame and extending upward through a passage in the supporting member, said rod having an enlarged head at its upper end, a sleeve like stop surrounding the rod above the supporting member and adjustably connected to said member, a spring acting to maintain contact between the head at the upper end of the rod and said adjustable stop, and means arranged below the sieve frame and adapted to intermittingly move it and said rod upward in opposition to the spring.

5. In a scalper sieve, the combination with a frame and a sieve mounted therein, of a relatively stationary supporting member positioned above the frame, a rod attached to the sieve frame and extending upward through a passage in the supporting member, said rod having an enlarged head at its upper end, an exteriorly threaded sleeve surrounding the rod and adjustable in the passage in the supporting member through which the rod extends, the outer end of said sleeve constituting a stop cooperating with the head on the rod to limit downward movement of the sieve frame, a lock nut engaging said sleeve and retaining it in adjusted relation to the supporting member, a spring surrounding each rod and acting to maintain the sieve frame in its lowermost position, and a rotary cam beneath the sieve frame adapted to move it in opposition to the spring.

In testimony whereof, I have hereunto set my hand.

EDMUND F. LAKE.